(12) United States Patent
Ahn et al.

(10) Patent No.: US 12,235,284 B2
(45) Date of Patent: Feb. 25, 2025

(54) ANEMOMETER USING THERMAL MASS AIR VELOCITY METER, FROM WHICH AMBIENT TEMPERATURE DEPENDENCE HAS BEEN REMOVED

(71) Applicants: CHC BIOTECH CO., LTD., Daejeon (KR); Jong Deuk Ahn, Chungcheongbuk-do (KR)

(72) Inventors: Jong Deuk Ahn, Chungcheongbuk-do (KR); Hyeong Cheol Cha, Daejeon (KR)

(73) Assignees: CHC BIOTECH CO., LTD., Daejeon (KR); Jong Deuk Ahn, Chungcheongbuk-do (KR)

( * ) Notice: Subject to any disclaimer, the term of this patent is extended or adjusted under 35 U.S.C. 154(b) by 243 days.

(21) Appl. No.: 18/014,069

(22) PCT Filed: Jul. 12, 2021

(86) PCT No.: PCT/KR2021/008877
§ 371 (c)(1),
(2) Date: Dec. 30, 2022

(87) PCT Pub. No.: WO2022/014983
PCT Pub. Date: Jan. 20, 2022

(65) Prior Publication Data
US 2023/0266355 A1  Aug. 24, 2023

(30) Foreign Application Priority Data

Jul. 13, 2020  (KR) .................... 10-2020-0086473

(51) Int. Cl.
*G01P 5/12* (2006.01)
*G01F 1/688* (2006.01)

(52) U.S. Cl.
CPC .............. *G01P 5/12* (2013.01); *G01F 1/6888* (2013.01)

(58) Field of Classification Search
CPC .......... G01P 5/12; G01F 1/6888; G01F 1/684; G01F 1/68; G01F 1/69; G01F 1/6847;
(Continued)

(56) References Cited

FOREIGN PATENT DOCUMENTS

| JP | 07-270441 | A1 | 10/1995 | |
|----|-----------|----|---------|--|
| JP | 07270441 | A  * | 10/1995 | ............... G01F 1/68 |

(Continued)

*Primary Examiner* — Eric S. McCall
*Assistant Examiner* — Anthony W Megna Fuentes
(74) *Attorney, Agent, or Firm* — NKL Law; Jae Youn Kim

(57) ABSTRACT

Proposed is an air velocity sensor (meter) for measuring the flow velocity of a fluid, particularly, the air velocity of gas. More specifically, proposed is a technical field related to an air velocity sensor which measures air velocity or temperature through the heat transfer of a fluid by using a hot wire, that is, a heating element, of a small cross-section, and which expands the surface areas of a temperature sensor, the heating element, and a soldering part in order to further improve the accuracy of a hot wire flow velocity sensor having higher accuracy, even with respect to a low flow velocity, than a general mechanical anemometer, so as to minimize resistance, and thus can easily measure very low flow rates by inducing a quick change in a current to quickly respond to minute changes in resistance and sensitively operate, that is, by improving reaction speed.

11 Claims, 11 Drawing Sheets

(58) Field of Classification Search
CPC ... G01F 1/74; G01F 1/662; G01F 1/00; G01F 15/00; G01F 1/7084; G01F 23/246; G01F 1/698; G01F 1/699; G01F 1/688; G01K 13/02; G01K 13/028; G01K 2205/02; G01K 7/02; G01K 13/00; G01K 7/22; G01K 7/18; G01K 1/00; F02D 41/187; F02D 41/18; F02D 2200/0414
See application file for complete search history.

(56) References Cited

FOREIGN PATENT DOCUMENTS

| | | |
|---|---|---|
| JP | 08-015296 A | 1/1996 |
| KR | 10-2010-0110213 A | 10/2010 |
| KR | 10-1257775 B1 | 4/2013 |
| KR | 10-2177856 B1 | 11/2020 |

* cited by examiner

ANEMOMETER USING THERMAL MASS AIR VELOCITY METER, FROM WHICH AMBIENT TEMPERATURE DEPENDENCE HAS BEEN REMOVED

TECHNICAL FIELD

The present disclosure fundamentally relates to an anemometer using a thermal mass air velocity sensor (meter) for measuring flow velocity of a fluid, particularly, air velocity of gas. More specifically, the present disclosure utilizes a phenomenon in which heat generated in a hot wire, that is, a heating element, of a small cross-section is differently conducted according to the moving speed of the fluid. The present disclosure relates to a thermal mass air velocity sensor manufactured by, in order to improve the performance of a conventional thermal mass air velocity sensor, mathematically modelling the structure of a thermal mass air velocity sensor, performing numerical analysis to improve performance, mathematically checking parameters to be controlled, and improving the structure of the sensor on the basis of the results, thereby removing ambient temperature dependence, which is a problem of conventional thermal mass air velocity sensors, and improving reaction speed. In particular, the present disclosure relates to an anemometer using a thermal mass air velocity sensor that can easily measure very low flow rates due to the increased sensitivity of the sensor to a signal change since the ambient temperature dependence is reduced compared to the conventional thermal mass air velocity sensors.

BACKGROUND ART

In general, wind speed or air velocity has a significant impact on everyday life. Indeed, in the developed industrial society, there are increasing number of fields in which work is affected by wind speed and wind power, and more accurate measurements are required as industry progresses.

Devices for measuring flow velocity, especially turbulent flow, include a hot wire anemometer (e.g., an "anemometer using a thermal mass air velocity sensor" of the present disclosure) and a laser anemometer. Both of these have advantages and disadvantages, so it is not a question of superiority or inferiority, and they are selected and used depending on the case.

Hot wire anemometers are classified into constant temperature anemometer (CTA), constant current anemometer (CCA), and constant voltage anemometer (CVA). Recently, a variable temperature anemometer (VTA), in which the temperature of a hot wire changes according to the speed or velocity, has been developed using the constant temperature anemometer as a basic model. In fact, the constant temperature anemometer is widely used as it has many advantages over the constant current anemometer.

In addition, among methods for measuring velocity, laser dopplers anemometry (LDV), particle image velocimetry (PIV), and hot wire anemometry (HWA) are representative methods to measure turbulence in fluids. As for the hot wire anemometry, the temperature of a thin heated wire (hot wire) is maintained higher than the temperature of a surrounding fluid, and when heat loss occurs in the hot wire, the heat loss is measured to calculate the velocity, that is, the air velocity.

In other words, a hot wire anemometer is a device that measures flow velocity, and when the temperature of a thin hot wire is kept higher than the surrounding fluid, heat transfer takes place from the hot wire to the flowing fluid. That is, the hot wire anemometer works on the principle that as the fluid velocity increases, heat loss increases, and the velocity may be calculated by measuring the heat loss.

The hot wire anemometer as described above has the advantage of high accuracy even at low flow rates, that is, very low flow rates, compared to a general mechanical anemometer, but it also has the disadvantage of being greatly affected by dust, temperature, humidity, signal noise, etc. during measurement.

The principle that energy consumed by a heating element of the present disclosure increases or decreases according to the increase or decrease of flow velocity is the basic principle of the air velocity sensor. In order to understand the problems of a conventional air velocity sensor, the energy consumed by the heating element is subdivided as follows: (1) energy taken from the heating element due to the flow of a fluid (convection); (2) energy conducted through a lead wire connecting the heating element and a soldering pad part; and (3) spatially radiated energy by the heating element. The sum of (1), (2), and (3) is the total energy consumed by the heating element. Items (2) and (3) are energy that is not directly proportional to the fluid flow. When item (1) is a signal component, items (2) and (3) are noise components. In the case of conventional air velocity sensors, although items (2) and (3) are removed through wind speed calibration and temperature calibration, when the range of ambient temperature change is wide or the change is rapid, the ambient temperature change still affects sensor errors.

PATENT LITERATURE (Patent Document 1) Korean Patent No. 10-1786741 (2017.10.11)
(Patent Document 2) Korean Patent Application Publication No. 10-2015-0070390 (2015.06.24)
(Patent Document 3) Korean Patent No. 10-1257775 (2013.04.24)

DISCLOSURE

Technical Problem

The present disclosure has been made keeping in mind the problems occurring in the related art. An objective of the present disclosure is to solve the problems of a conventional air velocity sensor by mathematically modelling and analyzing a thermal mass air velocity sensor to find parameters causing noise in the equation, and improving the structure and shape of the sensor in order to remove the cause of the noise.

The present disclosure is to solve the problems occurring in the related art described above. The problems of a conventional thermal mass air velocity meter are as follows: the shape of a through hole through which a fluid flow passes is simply formed in a circular shape, making it difficult to eliminate disturbances to the flow such as a vortex; the distance between leads for interconnecting a heating element and a temperature sensor becomes longer, resulting in increased (although the increase is small) resistance, which slows down the reaction speed; and malfunctions or product defects may occur because the heating element and the temperature sensor need to be deformed and installed as the respective lead, configured as a pair, is soldered and combined on the front and rear surfaces of a substrate.

In order to solve the above-mentioned problems, an objective of the present disclosure is to provide an anemometer using a thermal mass air velocity meter, in which a slit groove is formed on each side of a heating element hole and on each side of a temperature sensor hole, where a heating element and a temperature sensor are installed, respectively, so that a fluid in which a vortex is created passes through the slit grooves and is dispersed to minimize the occurrence of a vortex, and in which gold plating is applied to the front and rear surfaces around the heating element hole and the temperature sensor hole, as well as to the inner upper and lower surfaces of the heating element hole and the temperature sensor hole so that leads of the heating element and leads of the temperature sensor are electrically connected by soldering, thereby increasing the surface areas to minimize resistance and making the anemometer operate and respond sensitively even to minute changes in air velocity.

Technical Solution

In order to achieve the above mentioned objective, according to an embodiment of the present disclosure, there is provided an anemometer using a thermal mass air velocity meter, including: a substrate on which a circuit part is formed; a heating element part configured to extend from a first side of the substrate and through which a heating element hole in which a heating element is installed is formed; a pair of heating element soldering holes formed on a first side of the heating element part and spaced apart vertically so that a pair of leads of the heating element are connected; a temperature sensor part configured to extend from the first side of the heating element part and through which a temperature sensor hole in which the temperature sensor is installed is formed; and a pair of temperature sensor soldering holes formed on a second side of the temperature sensor part and spaced apart vertically so that a pair of leads of the temperature sensor are connected.

In addition, the heating element part of the present disclosure may include: a first heating element slit groove formed on the first side of the heating element part, formed between the pair of heating element soldering holes, and communicated with the heating element hole; and a second heating element slit groove formed on a second side of the heating element part and communicated with the heating element hole.

In addition, the temperature sensor part of the present disclosure may include: a first temperature sensor slit groove formed on the second side of the temperature sensor part, formed between the pair of temperature sensor soldering holes, and communicated with the temperature sensor hole; and a second temperature sensor slit groove formed on a first side of the temperature sensor part and communicated with the temperature sensor hole.

In addition, the heating element part of the present disclosure may include: a first upper heating element plating pattern part provided by plating gold on an upper part of a front surface of the heating element part and configured to include the upper heating element soldering hole of the pair of heating element soldering holes therein; and a first lower heating element plating pattern part provided by plating gold on a lower part of the front surface of the heating element part and configured to include the lower heating element soldering hole of the pair of heating element soldering holes therein.

In addition, the heating element part of the present disclosure may include: a second upper heating element plating pattern part provided by plating gold on an upper part of a rear surface of the heating element part and configured to include the upper heating element soldering hole of the pair of heating element soldering holes therein; and a second lower heating element plating pattern part provided by plating gold on a lower part of the rear surface of the heating element part and configured to include the lower heating element soldering hole of the pair of heating element soldering holes therein.

In addition, the heating element part of the present disclosure may include: an upper heating element plating part provided by plating gold on an upper surface of the heating element hole, and configured to connect the first upper heating element plating pattern part and the second upper heating element plating pattern part; and a lower heating element plating part provided by plating gold on a lower surface of the heating element hole, and configured to connect the first lower heating element plating pattern part and the second lower heating element plating pattern part.

In addition, the temperature sensor part of the present disclosure may include: a first upper temperature sensor plating pattern part provided by plating gold on an upper part of a front surface of the temperature sensor part and configured to include the upper temperature sensor soldering hole of the pair of temperature sensor soldering holes therein; and a first lower temperature sensor plating pattern part provided by plating gold on a lower part of the front surface of the temperature sensor part and configured to include the lower temperature sensor soldering hole of the pair of temperature sensor soldering holes therein.

In addition, the temperature sensor part of the present disclosure may include: a second upper temperature sensor plating pattern part provided by plating gold on an upper part of a rear surface of the temperature sensor part and configured to include the upper temperature sensor soldering hole of the pair of temperature sensor soldering holes therein; and a second lower temperature sensor plating pattern part provided by plating gold on a lower part of the rear surface of the temperature sensor part and configured to include the lower temperature sensor soldering hole of the pair of temperature sensor soldering holes therein.

In addition, the temperature sensor part of the present disclosure may include: a upper temperature sensor plating part formed by plating gold on the upper surface of the temperature sensor hole, and configured to connect the first upper temperature sensor plating pattern part and the second upper temperature sensor plating pattern part; and a lower temperature sensor plating part formed by plating gold on the lower surface of the temperature sensor hole, and configured to connect the first lower temperature sensor plating pattern part and the second lower temperature sensor plating pattern part.

Advantageous Effects

According to an anemometer using a thermal mass air velocity meter of the present disclosure, since a slit groove is formed on each side of a heating element hole and on each side of a temperature sensor hole, where a heating element and a temperature sensor are installed, respectively, a fluid in which a vortex is created passes through the slit grooves and is dispersed, thereby minimizing the occurrence of vortex and making it easy to measure flow velocity.

According to the anemometer using a thermal mass air velocity meter of the present disclosure, since leads of the heating element are soldered to one side of the hole of the heating element and leads of the temperature sensor are soldered to the other side of the hole of the temperature sensor, the separation distance between the leads of the heating element and the temperature sensor is minimized, thereby minimizing the resistance (although small) generated at the soldering area and improving the reaction speed.

According to the anemometer using a thermal mass air velocity meter of the present disclosure, by soldering and combining a pair of leads of the heating element and a pair of leads of the temperature sensor on either the front or rear surface of a substrate, it is not necessary to twist and deform the heating element and temperature sensor, and thus it is easy to work from one direction, and productivity can be improved by minimizing malfunctions or product defects during manufacturing. In addition, by installing the wide front-rear surfaces of the heating element and the temperature sensor horizontally in the heating element hole and the temperature sensor hole, the anemometer can operate sensitively even at low flow rates, particularly, by gold plating the front and rear surfaces around the heating element hole and the temperature sensor hole, as well as gold plating the inner upper and lower surfaces of the heating element hole and the temperature sensor hole, the leads of the heating element and the leads of the temperature sensor are electrically connected by soldering, so that the surface area is expanded to minimize resistance, and accordingly, the anemometer operates sensitively even at very low flow rates, resulting in improved reaction speed.

DESCRIPTION OF NUMERALS

Figure 1:
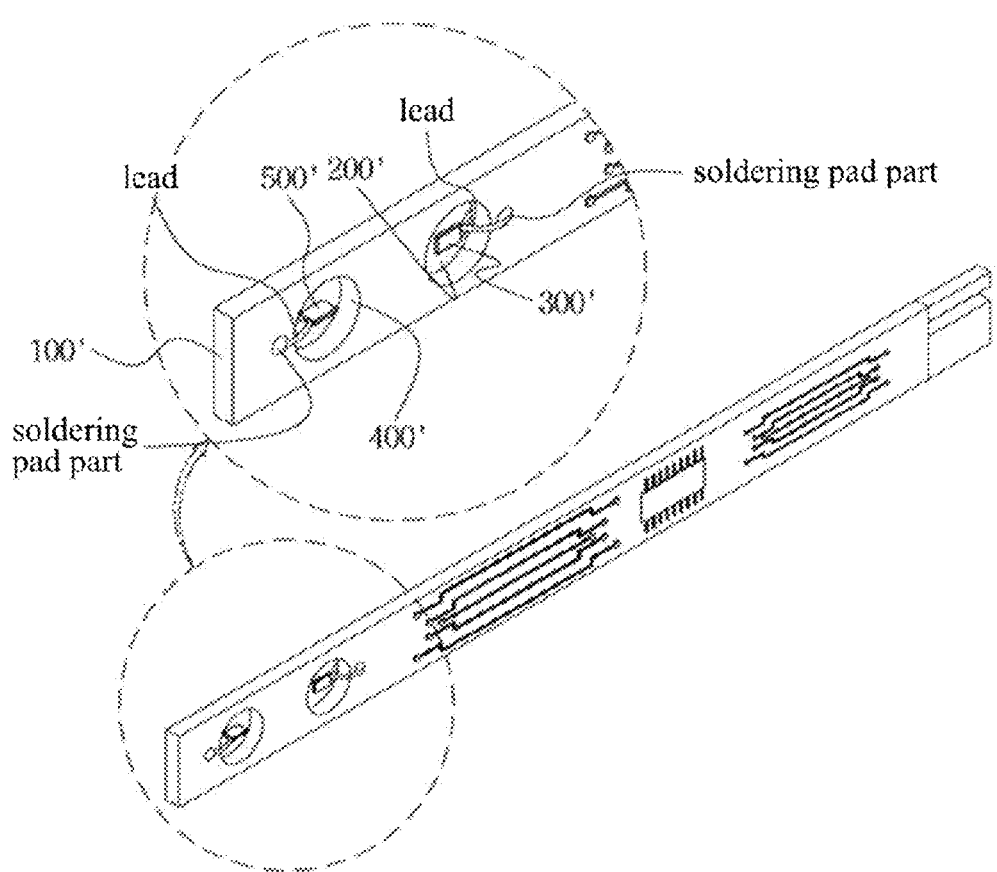
FIG. 1 is a front perspective view showing a conventional air velocity sensor.
Figure 2:
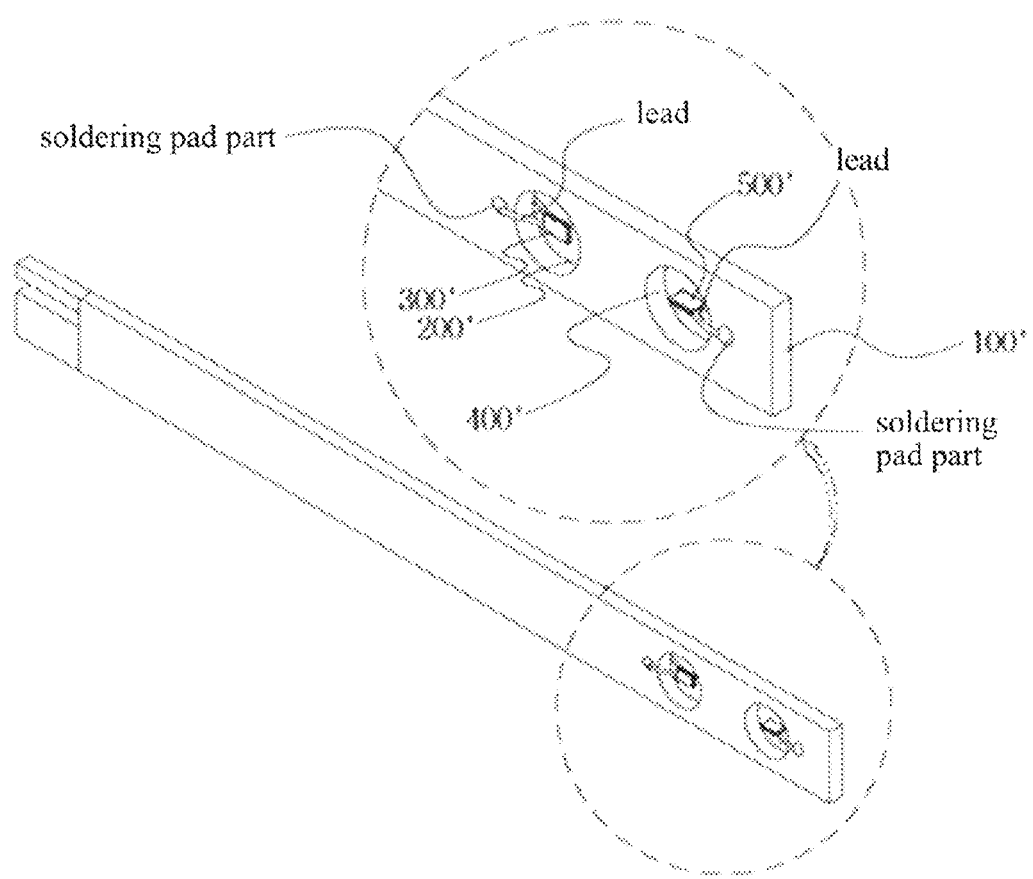
FIG. 2 is a rear perspective view showing the conventional air velocity sensor.
Figure 3:
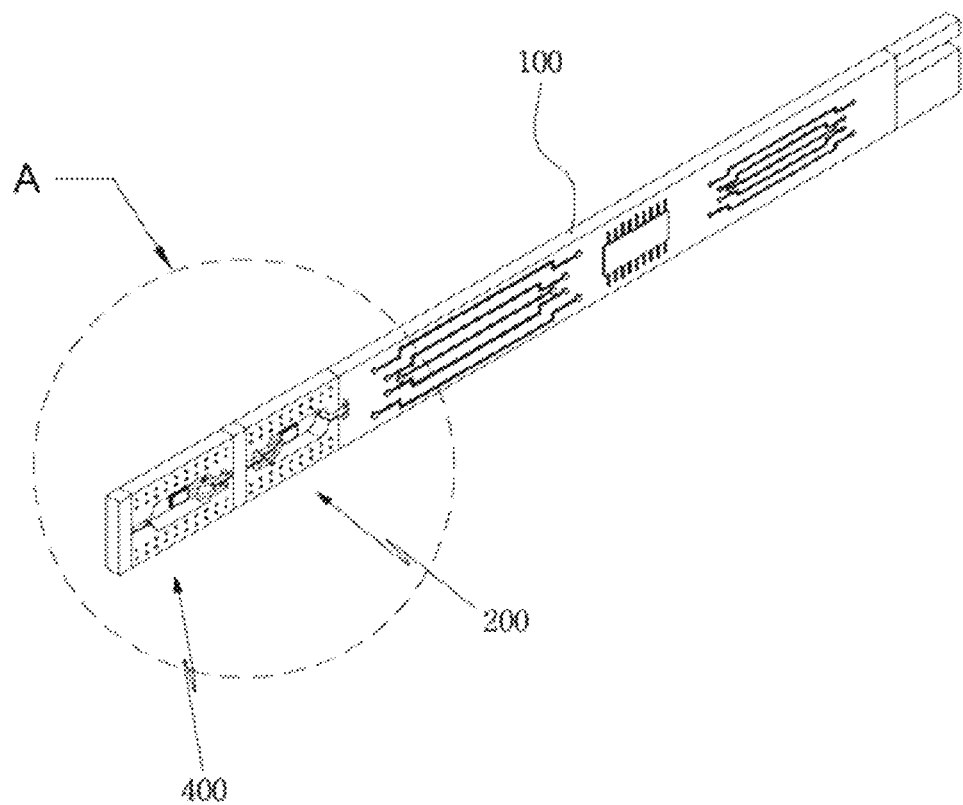
FIG. 3 is a front perspective view showing an air velocity meter according to a preferred embodiment of the present disclosure.
Figure 4:
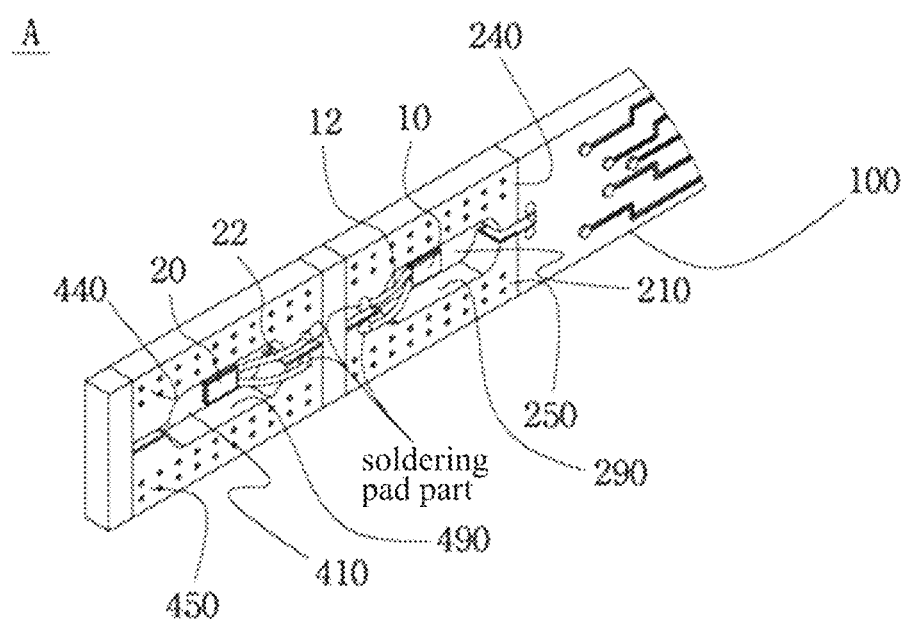
FIG. 4 is an enlarged view of part "A" of FIG. 3.
Figure 5:
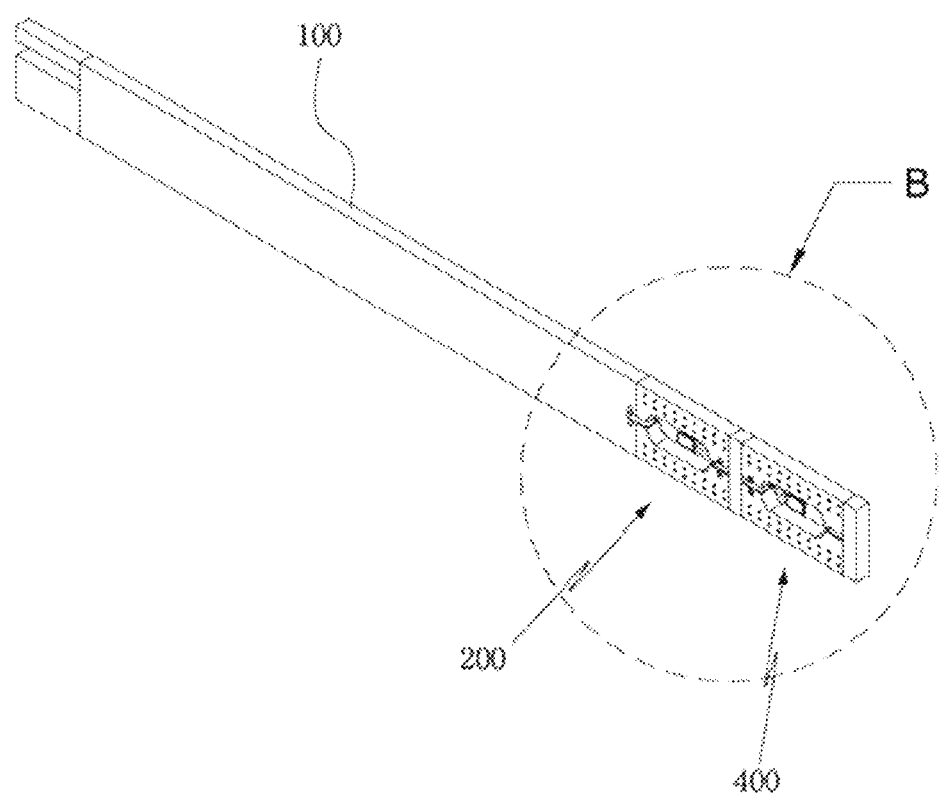
FIG. 5 is a rear perspective view showing the air velocity meter according to the preferred embodiment of the present disclosure.
Figure 6:
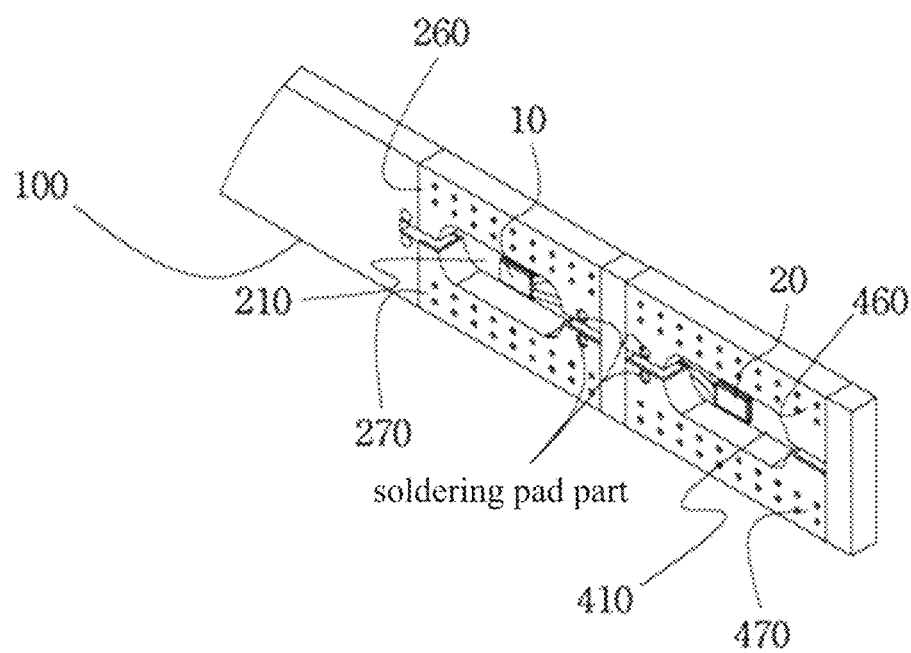
FIG. 6 is an enlarged view of part "B" of FIG. 5.
Figure 7:
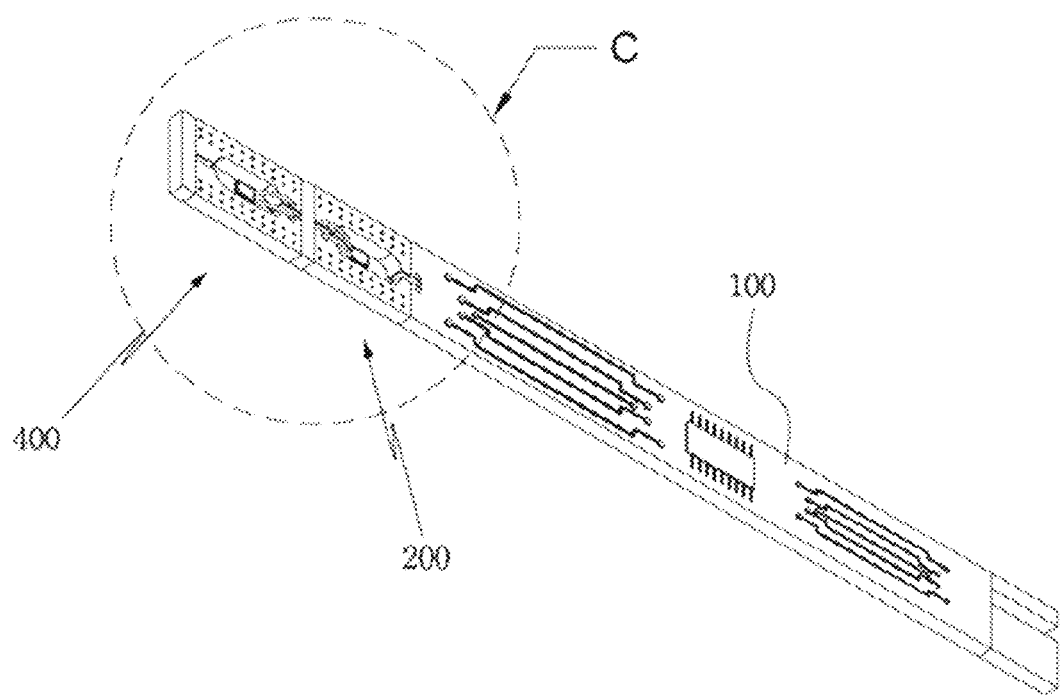
FIG. 7 is a bottom perspective view showing the air velocity meter according to the preferred embodiment of the present disclosure.
Figure 8:
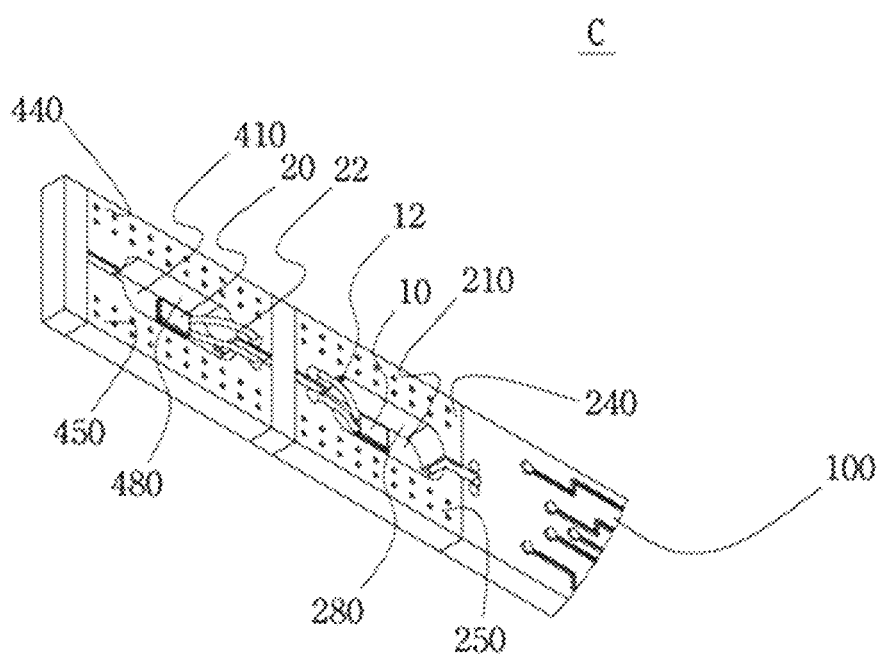
FIG. 8 is an enlarged view of part "C" of FIG. 7.
Figure 9:
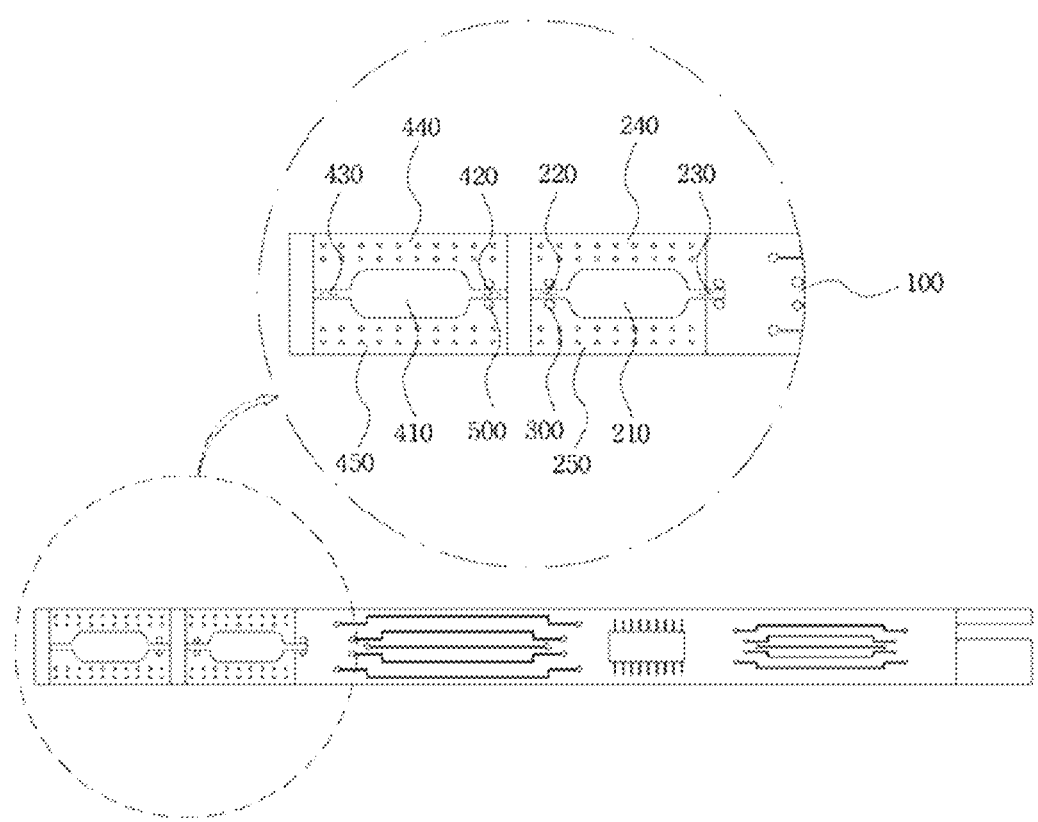
FIG. 9 is a front view showing a substrate of the air velocity meter according to the preferred embodiment of the present disclosure.
Figure 10:
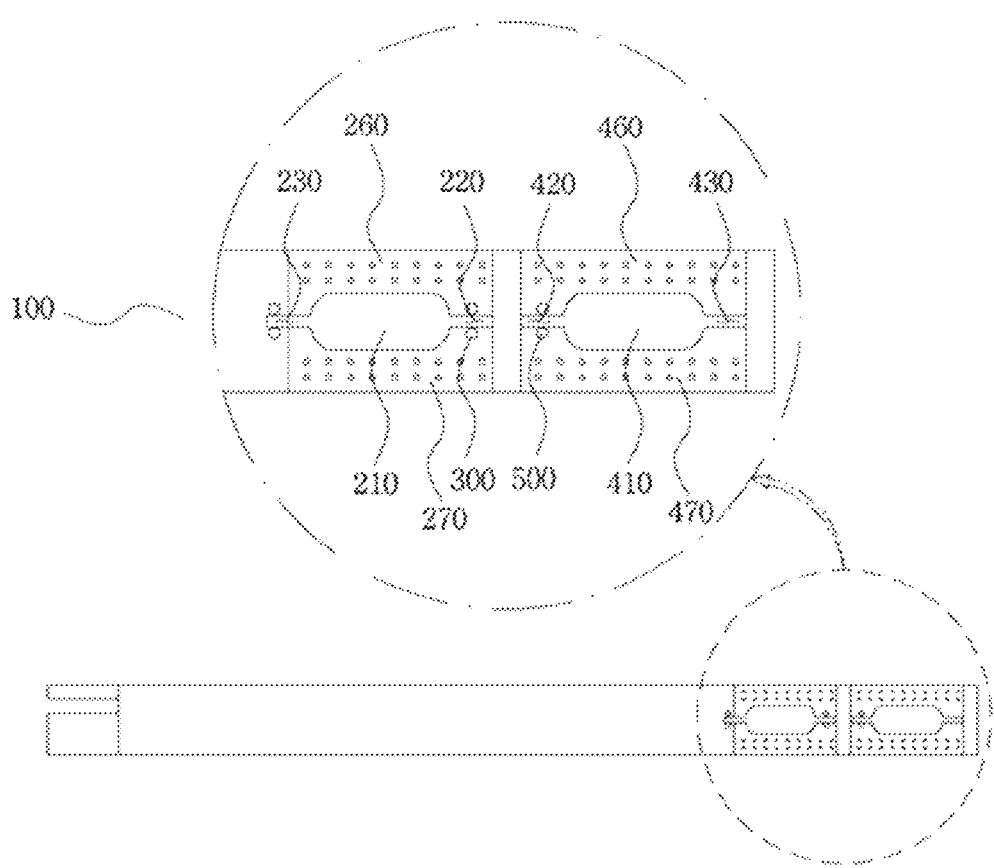
FIG. 10 is a rear view showing the substrate of the air velocity meter according to the preferred embodiment of the present disclosure.

10: heating element 12, 22: lead
20: temperature sensor
100: substrate 200: heating element part
210: heating element hole 220: first heating element slit groove
230: second heating element slit groove 240: first upper heating element plating pattern part
250: first lower heating element plating pattern part 260: second upper heating element plating pattern part
270: second lower heating element plating pattern part 280: upper heating element plating part
290: lower heating element plating part 300: heating element soldering hole

400: temperature sensor part 410: temperature sensor hole
420: first temperature sensor slit groove 430: second temperature sensor slit groove
440: first upper temperature sensor plating pattern part 450: first lower temperature sensor plating pattern part
460: second upper temperature sensor plating pattern part 470: second lower temperature sensor plating pattern part
480: upper temperature sensor plating part 490: lower temperature sensor plating part
500: temperature sensor soldering hole

BEST MODE

The present disclosure relates to an air velocity sensor (meter) for measuring the flow velocity of a fluid, particularly, the air velocity of gas. More specifically, the present disclosure relates to an air velocity sensor which measures air velocity or temperature through the heat transfer of a fluid by using a hot wire, that is, a heating element, of a small cross-section, and which expands the surface areas of a heating element 10, a temperature sensor 20, and a soldering part (not shown) in order to further improve the accuracy of a hot wire flow velocity sensor having higher accuracy, even with respect to a low flow velocity, than a general mechanical anemometer, so as to minimize resistance, and thus can easily measure very low flow rates by inducing a quick change in a current to quickly respond to minute changes in resistance and sensitively operate, that is, by improving reaction speed.

The configuration for achieving the present disclosure as described above includes: a substrate 100 on which a circuit part is formed; a heating element part 200 configured to extend from one side of the substrate 100 and through which a heating element hole 210 in which the heating element 10 is installed is formed; a pair of heating element soldering holes 300 formed on one side of the heating element part 200 and spaced apart vertically so that a pair of leads of the heating element 10 are connected; a temperature sensor part 400 configured to extend from one side of the substrate 100 and through which a temperature sensor hole 410 in which the temperature sensor 20 is installed is formed; and a pair of temperature sensor soldering holes 500 formed on the other side of the temperature sensor part 400 and spaced apart vertically so that a pair of leads of the temperature sensor 20 are connected.

In addition, the heating element part 200 of the present disclosure includes: a first heating element slit groove 220 formed on one side of the heating element part 200, formed between the pair of heating element soldering holes 300, and communicated with the heating element hole 210; and a second heating element slit groove 230 formed on the other side of the heating element part 200 and communicated with the heating element hole 210.

The temperature sensor part 400 of the present disclosure includes: a first temperature sensor slit groove 420 formed on the other side of the temperature sensor part 400, formed between the pair of temperature sensor soldering holes 500, and communicated with the temperature sensor hole 410; and a second temperature sensor slit groove 430 formed on one side of the temperature sensor part 400 and communicated with the temperature sensor hole 410.

In addition, the heating element part 200 includes: a first upper heating element plating pattern part 240 formed by plating gold on the upper part of the front surface of the heating element part 200 and configured to include the upper heating element soldering hole 300 of the pair of heating element soldering holes 300 therein; and a first lower heating element plating pattern part 250 formed by plating gold on the lower part of the front surface of the heating element part 200 and configured to include the lower heating element soldering hole 300 of the pair of heating element soldering holes 300 therein.

In addition, the heating element part 200 includes: a second upper heating element plating pattern part 260 formed by plating gold on the upper part of the rear surface of the heating element part 200 and configured to include the upper heating element soldering hole 300 of the pair of heating element soldering holes 300 therein; and a second lower heating element plating pattern part 270 formed by plating gold on the lower part of the rear surface of the heating element part 200 and configured to include the lower heating element soldering hole 300 of the pair of heating element soldering holes 300 therein.

In addition, the heating element part 200 includes: an upper heating element plating part 280 formed by plating gold on the upper surface of the heating element hole 210, and configured to connect the first upper heating element plating pattern part 240 and the second upper heating element plating pattern part 260; a lower heating element plating part 290 formed by plating gold on the lower surface of the heating element hole 210, and configured to connect the first lower heating element plating pattern part 250 and the second lower heating element plating pattern part 270.

In addition, the temperature sensor part 400 includes: a first upper temperature sensor plating pattern part 440 formed by plating gold on the upper part of the front surface of the temperature sensor part 400 and configured to include the upper temperature sensor soldering hole 500 of the pair of temperature sensor soldering holes 500 therein; and a first lower temperature sensor plating pattern part 450 formed by plating gold on the lower part of the front surface of the temperature sensor part 400 and configured to include the lower temperature sensor soldering hole 500 of the pair of temperature sensor soldering holes 500 therein.

In addition, the temperature sensor part 400 includes: a second upper temperature sensor plating pattern part 460 formed by plating gold on the upper part of the rear surface of the temperature sensor part 400 and configured to include the upper temperature sensor soldering hole 500 of the pair of temperature sensor soldering holes 500 therein; and a second lower temperature sensor plating pattern part 470 formed by plating gold on the lower part of the rear surface of the temperature sensor part 400 and configured to include the lower temperature sensor soldering hole 500 of the pair of temperature sensor soldering holes 500 therein.

In addition, the temperature sensor part 400 includes: a upper temperature sensor plating part 480 formed by plating gold on the upper surface of the temperature sensor hole 410, and configured to connect the first upper temperature sensor plating pattern part 440 and the second upper temperature sensor plating pattern part 460; and a lower temperature sensor plating part 490 formed by plating gold on the lower surface of the temperature sensor hole 410, and configured to connect the first lower temperature sensor plating pattern part 450 and the second lower temperature sensor plating pattern part 470.

According to an anemometer using a thermal mass air velocity sensor (meter) of the present disclosure, the temperature of the heating element 10 changes when the amount of heat transferred increases with the increase in flow rate, that is, the resistance of the heating element 10 decreases when the temperature of the heating element 10 decreases due to heat loss of the heating element 10 as air flow rate increases while the resistance of the heating element 10 increases when air flow rate decreases. Although this change in resistance is extremely minute, the air velocity sensor of the present disclosure amplifies and calculates the minute current and resistance change so as to be measurable using a bridge circuit, so that air velocity may be measured.

Figure 11:
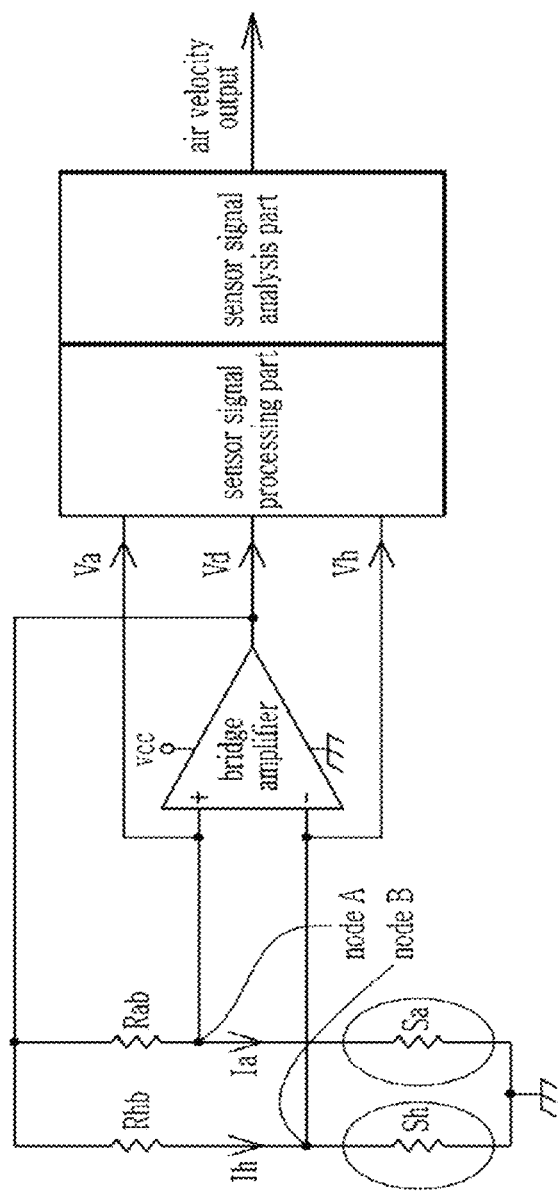
FIG. 11 is a bridge circuit.

Description of Abbreviations of Bridge Circuit in FIG. 11

Sh: heating element Sa: temperature sensor
Rhb: heating element bridge resistance Rab: temperature sensor bridge resistance
Va: voltage across temperature sensor Vh: voltage across heating element
Vd: amplifier output voltage
Ih: current flowing in heating element leg of bridge
Ia: current flowing in temperature sensor leg of bridge
Rh: resistance of heating element Ra: resistance of temperature sensor ① Balanced Bridge Circuit When the bridge circuit is balanced, the potential difference between node A and node B becomes zero, so Ia*Sa=Ih*Sh, and when the bridge circuit is balanced, Vab=0.

In the balanced bridge circuit, parts exposed to air to measure air velocity are the heating element Sh and the ambient temperature sensor Sa, and when wind blows and the resistance of Sh decreases, a voltage at a non-inverting terminal of a bridge amplifier becomes higher than that of an inverting terminal of the bridge amplifier, and as a result, the driving voltage Vd increases, and as a result, heat generation of the heating element increases, and as a result, the resistance of Sh increases, so that the bridge circuit is balanced again.

Since the relationship between the resistance of the temperature sensor Sa and the resistance of the heating element Sh is "resistance of the temperature sensor Sa>>resistance of the heating element Sh", for the same Vd increase or decrease, Sa's self-heating is much smaller than Sh's self-heating, and thus the Vd increase or decrease mainly increases or decreases the resistance of the heating element Sh.

② Calorific Value (pH) of the Heating Element 10

In order for the heating element to operate sensitively, compensate for 30° C. than the ambient temperature (e.g., 20° C.) to maintain 50° C., energy consumed by a heating element 300' in FIG. 1 mathematically expressed as follows.

$$Ph = Pca + Pe + Pcl \quad \text{(Equation 1)}$$

Ph: total power consumption of heating element
Pca: power consumption of heating element by air flow
Pe: power consumption of heating element by convection and radiation
Pcl: power consumption by heating element leads and soldering pads The elements used in the thermal mass air velocity sensor are the heating element and the ambient temperature sensor. The two elements have the same positive temperature resistance coefficient and are a kind of resistance element with Ra>>Rh. The circuit parameters are set so that the temperature of the heating element is always maintained at a constant temperature (e.g., 30° C.) higher than the ambient temperature using the <Bridge Circuit>below. For example, when the ambient temperature is 20° C., the temperature of the heating element is 50° C.

In the bridge circuit, a sensor circuit operation is such that the heating element Sh and the ambient temperature sensor Sa are located in passages through which gas flows as shown in FIG. 1. To be specific, (1) when the flow of gas increases and more heat is taken away from the heating element Sh, (2) the temperature of Sh goes down, (3) and as a result, the resistance of Sh decreases, (4) and as a result, a non-inverting input voltage of the bridge amplifier becomes larger than an inverting input voltage of the bridge amplifier, and as a result, Vd increases, (5) and as the Vd voltage increases and self-heating of Sh increases, the resistance of Sh increases and the circuit is balanced again, (6) and when the flow of gas decreases, the resistance of Sh decreases by the same logic and equilibrium is achieved.

That is, the increase and decrease of gas flow is reflected in the increase and decrease of Vd and the increase and decrease in power consumption of Sh. Since values of the supply voltage Vd and the balance resistances Rhb and Rab of each side are known in the bridge circuit, a sensor-embedded MCU may calculate the resistances of Sh and Sa and the power consumption of Sh and Sa. In the above circuit, although self-heating occurs not only on the heating element side but also on the ambient temperature sensor side, by making the relationship Ra>>Rh between the resistance Ra of Sa and the resistance Rh of Sh, it is possible to reduce the self-heating of the ambient temperature sensor to a negligible level.

For example, comparing the amounts of heat released (calorific value) from Sa and Sh in the sensor of the bridge circuit when Ra=Rh*500 (=when the resistance of the temperature sensor is 500 times greater than the resistance of the heating element) in an equilibrium state of air velocity=0 and room temperature is 24° C., in the case of a current flowing in the heating element branch of the bridge: Ih=Vd/(Rhb+Rh),
current flowing in the temperature sensor branch of the bridge: Ia=Vd/(Rab+Ra), and
Ra=Rh*500, (Rab+Ra)=(Rhb+Rh)*500 to achieve equilibrium in the bridge, and thus Ih=Ia*500, and (power consumption of the heating element)/(power consumption of the temperature sensor)=500*Ia$^2$/Ia$^2$Ra=500 since the power consumption of the heating element is Ph=Ih$^2$Rh=(500*Ia)$^2$Rh=(500*Ia)$^2$(1/500)*Ra and the power consumption of the temperature sensor is Pa=Ia$^2$Ra=Ia$^2$Ra.

Since the power consumption of the temperature sensor is 1/500 of the power consumption of the heating element, in case the temperature sensor and the heating element have the same external size and temperature coefficient of resistance, when the temperature of the heating element rises by 30° C. due to self-heating, the temperature of the temperature sensor rises by 0.06° C. in simple proportion, and thus the resistance of the temperature sensor, in fact, has a resistance value that displays the ambient temperature regardless of the magnitude of the driving voltage. Under these conditions, adjust the value of Rhb so that the resistance of Sh is maintained constant (for example, 30° C.) higher than the ambient temperature at a wind speed of 0 m/sec.

In order to analyze the ambient temperature dependence of the conventional thermal mass air velocity sensor, the process of generating heat by the heating element is analyzed in detail. In Equation 1 above, $$Ph=Pca+Pe+Pcl \quad \text{(Equation 1)}$$

Ph: total power consumption of heating element
Pca: power consumption due to air flow (convection) passing through the heating element (It changes depending on the difference between the heating temperature of the heating element and the ambient air temperature, and the air velocity.)
Pe: power consumption by radiation of the heating element (It changes according to the Stefan-Boltzmann law regarding the heating temperature of the heating element and the ambient air temperature.)
Pcl: power consumption by conduction through the metal lead wire between the heating element↔soldering pad (It varies depending on the temperature difference between the heating element and the soldering pad and the temperature conductivity of the lead wire of the heating element.)

Expressing the above as a formula is:

$$Pca=H(v)*A*(Th-Ta) \quad \text{(Equation 2)}$$

$$Pe=\sigma\varepsilon A(Th^4-Ta^4) \quad \text{(Equation 3)}$$

$$Pcl=Kl*(Th-Tp) \quad \text{(Equation 4)}$$

H(v): convective heat transfer coefficient as a function of velocity change with the mechanical shape of the air velocity sensor fixed
Kl: thermal conduction through the heating element lead connecting the heating element and the soldering pad with the mechanical shape of the air velocity sensor is fixed
Th: temperature of the heating element, Ta: ambient temperature
Tp: soldering pad temperature on PCB, σ: Stefan-Boltzmann constant
ε: emissivity of the heating element, A: surface area of the heating element When exposing an air velocity sensor, such as <Bridge Circuit>, to a changing velocity in an environment where the ambient temperature is constantly fixed, Pcl and Pe become constants in (Equation 1).

The reason is that Ta and Th are fixed in (Equation 3) and Th and Tp are fixed in (Equation 4). When a relational expression between velocity and power consumption is derived in such an environment, an error occurs in case the relational expression is applied in an environment where the ambient temperature is changed.

The reason is that Ta and Th in (Equation 3) and Th and Tp in (Equation 4) are different from when the relational expression was derived, and while Pe in (Equation 3) may be known by measuring Ta and Th, and σ, ε, and A may be known by measurement and calculation since they are constants, Tp in (Equation 4) is difficult to measure and changes slowly depending on the ambient temperature, making it difficult to model by formula. Indeed, the temperature dependence of the air velocity sensor is mostly due to the uncertainty of Tp.

In the present disclosure, Tp may be predicted by improving the structure and shape of the sensor, so that the temperature dependence of the air velocity sensor is significantly reduced to increase the accuracy of the sensor, while the heat entering the soldering pad through the heating element lead wire escapes through the following three paths, and the soldering pad temperature becomes slightly higher than the ambient temperature, achieving thermal equilibrium.

The three paths are divided into (1) conduction between the soldering pad and the surrounding PCB, (2) convection flow passing through the soldering pad, and (3) radiation from the soldering pad, and the path (3) is Stefan-Boltzmann radiation. Stefan-Boltzmann radiation is insignificant and negligible when the temperature of a heat source is slightly higher than the ambient temperature, and thus the thermal equilibrium equation for the soldering pad is as follows.

$$Kl*(Th-Tp)=Kp*A*(Tp-Ta)+h*A*(Tp-Ta) \quad \text{(Equation 5-1)}$$

Kl*(Th−Tp): energy coming from the heating element to the soldering pad through the lead wire
Kp*A*(Tp−Ta): energy escaping from the soldering pad through the PCB to the surroundings
h*A*(Tp−Ta): energy escaping from the soldering pad to the surroundings via convection
Kp: conductivity between soldering pad and PCB, h: convective heat transfer coefficient
A: surface area of the soldering pad
Th, Ta, Tp, Kl are the same as in (Equation 1) to (Equation 4), and (Equation 5-1) is summarized for Tp as follows.

$$Kl*Th-Kl*Tp=Kp*A*Tp-Kp*A*Ta+h*A*Tp-h*A*Ta;$$

$$Kp*A*Tp+h*A*Tp+Kl*Tp=Kl*Th+Kp*A*Ta+h*A*Ta$$

$$Tp = \frac{Kl*Th + Kp*A*Ta + h*A*Ta}{Kp*A + h*A + Kl} \quad \text{(Equation 5-2)}$$

Applying a limit condition to Equation 5-2 above, when A goes to infinity, Tp=Ta, and when Kp goes to infinity, Tp=Ta, which means that the larger the surface area of the soldering pad and the better the conductivity of the soldering pad, the closer the temperature of the soldering pad is to the ambient air temperature.

Based on this principle, in the present disclosure, the soldering pad is enlarged and the surface thereof is plated with a metal (e.g., gold) with good thermal conductivity so that the soldering pad may exchange heat well with the surrounding air, so that the temperature of the soldering pad is almost the same as the ambient temperature. That is, Tp≈Ta.

$$Ph=Pca+Pcl+Pe=H(v)*A*(Th-Ta)+\sigma\varepsilon A(Th^4-Ta^4)+Kl*(Th-Tp) \quad \text{(Equation 6)}$$

Since Tp≈Ta in Equation 6 above, $$Ph=H(v)*A*(Th-Ta)+\sigma\varepsilon A(Th^4-Ta^4)+Kl*(Th-Ta) \quad \text{(Equation 7)}$$

In Equation 7, the first term, H(v)*A*(Th−Ta), is the power consumption by air flow, and since Th−Ta is not affected by the ambient temperature because the difference is maintained constant (for example, 30° C.) even if the ambient air temperature changes, the first term is a function of velocity only.

The second term, $\sigma\varepsilon A(Th^4-Ta^4)$, is the power consumption by radiation, which varies with temperature, but Ta may be known by measurement, and Th set at a constant temperature higher than Ta may also be known, and σ, ε, and A are constants that are fixed when the mechanical shape and constituent materials of the sensor are determined, so they may be known by calculation. That is, although the second term is affected by the ambient temperature, the value thereof may be calculated.

The third term, Kl*(Th−Ta), is the power consumption by conduction of energy from a heating element leg to the soldering pad, and is independent of the ambient temperature change for the same reason as the first term, and thus the third term is a fixed constant.

After calculating the power consumption by radiation, that is the second term of (Equation 7), and subtracting the calculated value from the total power consumption measured during sensor calibration, a relational expression between velocity and power consumption is derived, and when the value obtained by subtracting the power consumption by radiation from the total power consumption measured at a certain velocity during measurement is substituted into the relational expression derived during calibration, the velocity that is not affected by the ambient temperature is measured. Based on this principle, an anemometer using a thermal mass air velocity sensor, from which the ambient temperature dependence is removed, may be implemented.

The operation principle of the temperature sensor 20 and the heating element 10 of the anemometer using a thermal mass air velocity sensor of the present disclosure will be described in line with the above principle.

To be specific, the correlation between the temperature sensor 20 and the heating element 10 in terms of temperature change, resistance, and sensor sensitivity will be explained.

First, a relational expression of the electrical resistance (R) of the temperature sensor is $$\rho \frac{l}{A},$$

and here, ρ means the resistance value per unit area (mm') per unit length (m), the cross-sectional area is proportional to Adp, and the length is inversely proportional to l. That is, considering the situation where the potential difference (ΔV=EL) is applied to the wire of the temperature sensor, the total amount of charge (Q) contained in this wire is Q=A×, and dividing it by the time of both sides is Q/t=AL/t, where Q/t=I (current) and L/t=v (flow rate).

It may be expressed as R=ΔV/I=EL/AL according to Ohm's law. At this time, since the electrical resistance (R) of the temperature sensor 20 of the present disclosure represents the ratio of the initial measurement resistance and the amount of change in the detected and measured resistance, the amount of change in resistance (ΔR) is designed in consideration of the area and specific resistance.

In particular, the difference in the amount of change in electrical resistance has an effect on the sensitivity of the sensor. That is, the amount of change in electrical resistance may be detected by utilizing a negative characteristic thermistor whose output signal decreases as the temperature rises. In other words, the area (A), length (l), and specific resistance (ρ) for reducing the electrical resistance value are considered.

The present disclosure has the following technical features. In order to increase the area of the temperature sensor and considering the specific resistance and thermal and electrical conductivity, the area of the temperature sensor is designed to be large and is designed as a stacked area in the step of electrode deposition by making a difference from a point electrode shape and resistive materials of the conventional temperature sensor and air velocity sensor.

In addition, the electrode area was maximized by increasing the area of the temperature sensor, and at the same time, by securing the entire electrode, that is, gold (AU) electrode in consideration of thermal and electrical conductivity by using a deposition method (evaporator).

A thermistor is used as the temperature sensor 20 of the present disclosure. Most materials change their electrical resistance with temperature, and thermistors use this property. As the thermistor for the present disclosure, a thermistor having a negative temperature coefficient (NTC) according to the increasing or decreasing temperature is used. In addition, materials such as platinum, gold, polysilicon, Ni-ZrO2 cermet film, amorphous germanium, silicon carbide may be used for the thermistor. In the present disclosure, gold was selected in consideration of electrical conductivity and thermal conductivity and placed as a resistance element for measuring heat flow and flow velocity of air.

The heating element 10 of the present disclosure uses the Seebeck effect in which a voltage proportional to the temperature difference is generated when two dissimilar metals are joined together and an electric current flows therethrough.

At this time, a thermocouple is utilized using the Seebeck coefficient. The thermocouple is used to measure instantaneous flow rate or instantaneous wind speed by detecting temperature changes, and to sense the temperature, aluminum and polysilicon were deposited on silicon and used as a thermocouple.

In addition, the anemometer using a thermal mass air velocity sensor of the present disclosure consists of the heating element 10 and the temperature sensor 20 installed around the heating element 10, and uses a method in which the ambient temperature of the heating element 10 is changed by the air velocity or flow velocity, which is detected by the temperature sensor. At this time, a hot wire anemometer composed of a hot wire or a hot film based on the heat measurement principle is applied.

The hot wire anemometer is composed of a heated hot wire, and works on the principle that the amount of heat transfer increases or decreases according to the air velocity or flow velocity when the electrically heated wire is in the flow of fluid is used. In other words, when the hot wire is within the flow of fluid, heat is transferred from the hot wire to the fluid. Applying thermal equilibrium, the heat transfer from the hot wire may be seen as equal to the amount of heat generated (calorific value) due to the current flowing through the hot wire.

In addition, since the amount of heat transfer is proportional to the area and inversely proportional to the electrical resistance when citing the relational expression of the surface area (RLD) and electrical resistance of the hot wire, the sensing sensitivity effect for the large-area electrode of the present disclosure is excellent. Moreover, since the thickness (value) of the hot wire is much smaller than the length thereof, the heat transfer is mainly due to the convection according to air velocity, and the amount of heat transfer is given as:

$$\frac{V^2}{R} = q = h \cdot Aw \cdot \Delta T_{wg} = Nu \cdot \left(\frac{A_w}{D}\right) \cdot k \cdot \Delta T_{wg} = Nu \cdot \pi \cdot L \cdot k \cdot \Delta T_{wg}$$ (Equation 8)

in which the amount of heat transfer is expressed by Newton's law of cooling.

Nu represents Nusselt number (Nu=hD/k), H is the convective heat transfer coefficient (W/m²K or W/m²° C.), k is the thermal conductivity of the fluid (W/mK or W/m° C.), D is the diameter of the hot wire, Aw is the surface area of the hot wire (RLD), L is the length of the hot wire, ΔTwg=temperature of the hot wire-air velocity, and fluid temperature=Tw−Tg.

The relational expression between the Nusselt number and the Reynolds number (Re=UD/v) may be obtained from the heat transfer in a cylinder placed in the flow of fluid as in Equation 9.

$$Nu = A + B\sqrt{Re}$$ (Equation 9)

U is the air velocity or flow rate of the fluid, v is the air velocity and the viscosity of the fluid, and A and B are constants.

Therefore, the relational expression Equation 10 may be obtained by combining Equation 8 and Equation 9 above.

$$\frac{V^2}{R} = (A' + B'\sqrt{U})(T_w - T_y)$$ (Equation 10)

From these equations, A' and B' are constants that are determined and Equation 10 follows King's law. The hot wire anemometer is not linear in its relationship with voltage, air velocity and flow velocity, but has characteristics proportional to the square root of air velocity and flow velocity.

In the air velocity meter of the present disclosure, parts where the temperature sensor 20 and the heating element are respectively coupled, that is, the temperature sensor hole 410 and the heating element hole 210 are formed in an elliptical shape and applied to measure the air velocity in order to avoid generating turbulent flow in which flow velocity changes rapidly with time.

The air velocity meter of the present disclosure is a thermal mass air velocity sensor with small gaps between hot wires and has the advantage of faster response time by sensitively responding to changes in air velocity or fluid flow. In addition, the structure is simple, which makes manufacturing easy and lowers the manufacturing cost.

However, there is a disadvantage that the output value of the sensor is low due to high thermal conductivity. To make up for this shortcoming, in the present disclosure, a differential amplifier, which is a precision amplifier, is used to increase the sensor output value so that the output value decreases when the air velocity increases due to the non-linear sensitivity, and a balanced bridge circuit is used to prevent the accuracy from being affected by the fluid properties or dust.

Hereinafter, the configuration of the air velocity meter of the present disclosure will be described in detail with reference to FIGS. 1 to 10 illustrating an embodiment of the present disclosure.

First, the anemometer using a thermal mass air velocity sensor of the present disclosure includes: a substrate 100 on which a circuit part is formed; a heating element part 200 including a heating element hole 210 formed through the substrate 100 and a heating element 10 installed in the heating element hole 210; a temperature sensor part 400 including a temperature sensor hole 410 formed through the substrate 100 and a temperature sensor 20 installed in the temperature sensor hole 410.

The substrate 100 has the temperature sensor hole 410 formed on one side thereof, and the temperature sensor part 400 is provided with the temperature sensor hole 410. The heating element hole 210 is formed on the other side of the temperature sensor hole 410, and the heating element part 200 is provided with the heating element hole 210. The circuit part is formed on the other side of the heating element hole 210, a controller part (not shown) is included in the circuit part, and a connection part (not shown) connected to a device is provided at the end of the substrate 100.

That is, the substrate 100 has the heating element hole 210 formed therethrough on one side thereof, and the heating element part 200 in which the heating element 10 is installed extends integrally with the heating element hole 210, while the temperature sensor hole 410 is formed through the substrate 100 on one side of the heating element part 200, and the temperature sensor part 400 in which the temperature sensor 20 is installed extends integrally with the temperature sensor hole 410.

At this time, the heating element hole 210 and the temperature sensor hole 410 are formed in an elliptical shape so as to prevent the passing fluid, that is, air, from passing by causing a vortex phenomenon, making it possible to accurately measure instantaneous air velocity.

In addition, the anemometer using a thermal mass air velocity sensor of the present disclosure includes: a pair of heating element soldering holes 300 formed on one side of the heating element part 200 and spaced apart vertically so that a pair of leads of the heating element 10 are connected; and a pair of temperature sensor soldering holes 500 formed on the other side of the temperature sensor part 400 and spaced apart vertically so that a pair of leads of the temperature sensor 20 are connected.

That is, pairs of leads 12 and 22 of the heating element 10 and the temperature sensor 20 are inserted into the heating element soldering holes 300 and the temperature sensor soldering holes 500, respectively, and soldered to form soldering pad parts (not shown).

Meanwhile, the heating element part 200 includes: a first heating element slit groove 220 formed on one side of the heating element part 200, formed between the pair of heating element soldering holes 300, and communicated with the heating element hole 210.

The first heating element slit groove 220 separates the pair of leads 12 of the heating element 10 so that the leads 12 are electrically spaced apart, thereby preventing malfunction due to a short circuit in the circuit. In addition, although the heating element hole 210 is formed in an elliptical shape in order to prevent vortex generation when air passes through the heating element hole 210, it is difficult to completely eliminate vortices in the air flow. Thus, by forming the first heating element slit groove 220 to allow air to pass through, it is possible to more accurately measure air velocity by suppressing vortex formation.

Moreover, the upper and lower parts of the first heating element slit groove 220 are plated with gold to electrically connect the first upper heating element plating pattern part and the second upper heating element plating pattern part, and the first lower heating element plating pattern part and the second lower heating element plating pattern part. The first heating element slit groove 220 widens the surface area of the heating element plating pattern part and minimizes electrical resistance.

In order to further suppress vortex formation, the heating element part 200 may also include: a second heating element slit groove 230 formed on the other side of the heating element part 200 and communicated with the heating element hole 210. The second heating element slit groove 230 is formed in the same configuration as the first heating element slit groove 220 as previously mentioned, suppresses the vortex formation in the same way as the first heating element slit groove 220, and minimizes electrical resistance by widening the surface area of the heating element plating pattern part.

Meanwhile, the temperature sensor part 400 includes: a first temperature sensor slit groove 420 formed on the outer side of the heating element part 200, formed between the pair of temperature sensor soldering holes 500, and communicated with the temperature sensor hole 410.

Like the first heating element slit groove 220 described above, the first temperature sensor slit groove 420 separates the pair of leads 22 of the temperature sensor 20 so that the leads 22 are electrically spaced apart, thereby preventing malfunction due to a short circuit in the circuit. In addition, although the temperature sensor hole 410 is formed in an elliptical shape in order to prevent vortex generation when air passes through the temperature sensor hole 410, it is difficult to completely eliminate vortices in the air flow. Thus, by forming the first temperature sensor slit groove 420 to allow air to pass through, it is possible to more accurately measure air velocity by suppressing vortex formation.

Moreover, the upper and lower parts of the first temperature sensor slit groove 420 are plated with gold to electrically connect the first upper temperature sensor plating pattern part and the second upper temperature sensor plating pattern part, and the first lower temperature sensor plating pattern part and the second lower temperature sensor plating pattern part. The first temperature sensor slit groove 420 widens the surface area of the temperature sensor plating pattern part and minimizes electrical resistance.

In order to further suppress vortex formation, the temperature sensor part 400 may also include: a second temperature sensor slit groove 430 formed on one side of the temperature sensor part 400 and communicated with the temperature sensor hole 410. The second temperature sensor slit groove 430 is formed in the same configuration as the first temperature sensor slit groove 420 as previously mentioned, suppresses the vortex formation in the same way as the first temperature sensor slit groove 420, and minimizes electrical resistance by widening the surface area of the heating element plating pattern part.

In addition, the heating element part 200 includes: a first upper heating element plating pattern part 240 formed by plating gold on the upper part of the front surface of the heating element part 200 and configured to include the upper heating element soldering hole 300 of the pair of heating element soldering holes 300 therein; and a first lower heating element plating pattern part 250 formed by plating gold on the lower part of the front surface of the heating element part 200 and configured to include the lower heating element soldering hole 300 of the pair of heating element soldering holes 300 therein.

The heating element soldering holes 300 formed to correspond to the pair of leads 12 of the heating element 10 are also made of a pair. As the first upper heating element plating pattern part 240 is plated by including the upper heating element soldering hole 300 of the pair of heating element soldering holes 300 therein, the upper lead of the leads 12 of the heating element 10 is soldered in the upper heating element soldering hole 300 to be electrically connected with the first upper heating element plating pattern part 240.

At this time, on the upper front and rear parts of the heating element 200, one of the leads 12 of the heating element 10 is soldered to the soldering pad part to be electrically connected, while on the lower front and rear parts of the heating element 200, the other one of the leads 12 of the heating element 10 is soldered to the soldering pad part to be electrically connected. Accordingly, by enlarging the surface area of the soldering part to 100 times or more of the cross-sectional area of the lead 12 of the heating element 10, the resistance may be minimized and the heat transfer rate may be maximized.

In addition, as the first upper heating element plating pattern part 240 is plated by including the upper heating element soldering hole 300 of the pair of heating element soldering holes 300 therein, the upper lead of the leads 12 of the heating element 10 is soldered in the upper heating element soldering hole 300 to be electrically connected with the first upper heating element plating pattern part 240.

In addition, as the first lower heating element plating pattern part 250 is plated by including the lower heating element soldering hole 300 of the pair of heating element soldering holes 300 therein, the lower lead of the leads 12 of the heating element 10 is soldered in the lower heating element soldering hole 300 to be electrically connected with the first lower heating element plating pattern part 250.

Furthermore, the heating element part 200 includes: a second upper heating element plating pattern part 260 formed by plating gold on the upper part of the rear surface of the heating element part 200 and configured to include the upper heating element soldering hole 300 of the pair of heating element soldering holes 300 therein; and a second lower heating element plating pattern part 270 formed by plating gold on the lower part of the rear surface of the heating element part 200 and configured to include the lower heating element soldering hole 300 of the pair of heating element soldering holes 300 therein.

Like the first upper heating element plating pattern part 240 and the first lower heating element plating pattern part 250, the second upper heating element plating pattern part 260 and the second lower heating element plating pattern part 270 are plated including the heating element soldering holes 300, respectively, so that the leads 12 of the heating element 10 are soldered to be electrically connected with the second upper heating element plating pattern part 260 and the second lower heating element plating pattern part 270.

At this time, the first upper heating element plating pattern part 240 and the first lower heating element plating pattern part 250, and the second upper heating element plating pattern part 260 and the second lower heating element plating pattern part 270 are partitioned by the heating element hole 210 and the first and second heating element slit grooves 220 and 230 described above.

The heating element part 200 includes: an upper heating element plating part 280 formed by plating gold on the inner upper surface of the heating element hole 210, and configured to connect the first upper heating element plating pattern part 240 and the second upper heating element plating pattern part 260.

The heating element part 200 further includes: a lower heating element plating part 290 formed by plating gold on the inner lower surface of the heating element hole 210, and configured to connect the first lower heating element plating pattern part 250 and the second lower heating element plating pattern part 270.

To sum up, in the heating element part 200 of the present disclosure, the first upper heating element plating pattern part 240 and the second upper heating element plating pattern part 260 are connected by the upper heating element plating part 280, and connected with the upper lead 12 of the pair of the leads 12 of the heating element 10, whereas the first lower heating element plating pattern part 250 and the second lower heating element plating pattern part 270 are connected by the lower heating element plating part 290, and connected with the lower lead 12 of the pair of the leads 12 of the heating element 10. Therefore, the surface area of the heating element 10 may be widened, and accordingly, the resistance of the heating element 10 is lowered, which leads to improved reaction speed compared to that of the conventional thermal mass anemometer, enabling more sensitive operation.

The first upper heating element plating pattern part 240 and the second upper heating element plating pattern part 260 are electrically connected by the upper heating element plating part 280, while the first lower heating element plating pattern part 250 and the second lower heating element plating pattern part 270 are electrically connected by the lower heating element plating part 290.

In other words, the first upper heating element plating pattern part 240, the second upper heating element plating pattern part 260, the upper heating element plating part 280, and the upper lead of the pair of leads 12 of the heating element 10 that is soldered to the soldering pad are all electrically connected, while the first lower heating element plating pattern part 250, the second lower heating element plating pattern part 270, the lower heating element plating part 290, and the lower lead of the pair of leads 12 of the heating element 10 that is soldered to the soldering pad are all electrically connected, thereby maximizing surface area, minimizing resistance, and maximizing thermal conductivity, which leads to improved reaction speed compared to that of the conventional thermal mass anemometer, enabling more sensitive operation.

In addition, as for the temperature sensor part 400, the configuration and effects for maximizing surface area, minimizing resistance, and maximizing conductivity by gold plating are the same as those of the heating element part 200.

To be specific, the temperature sensor part 400 of the present disclosure includes: a first upper temperature sensor plating pattern part 440 formed by plating gold on the upper part of the front surface of the temperature sensor part 400 and configured to include the upper temperature sensor soldering hole 500 of the pair of temperature sensor soldering holes 500 therein; and a first lower temperature sensor plating pattern part 450 formed by plating gold on the lower part of the front surface of the temperature sensor part 400 and configured to include the lower temperature sensor soldering hole 500 of the pair of temperature sensor soldering holes 500 therein.

The first upper temperature sensor plating pattern part 440 and the first lower temperature sensor plating pattern part 450 are plated including the respective temperature sensor soldering hole 500, as in the case of the heating element part 200 described above, so that the respective lead of the temperature sensor 20 is soldered to be electrically connected.

In addition, the temperature sensor part 400 includes: a second upper temperature sensor plating pattern part 460 formed by plating gold on the upper part of the rear surface of the temperature sensor part 400 and configured to include the upper temperature sensor soldering hole 500 of the pair of temperature sensor soldering holes 500 therein; and a second lower temperature sensor plating pattern part 470 formed by plating gold on the lower part of the rear surface of the temperature sensor part 400 and configured to include the lower temperature sensor soldering hole 500 of the pair of temperature sensor soldering holes 500 therein.

Like the first upper temperature sensor plating pattern part 440 and the first lower temperature sensor plating pattern part 450, the second upper temperature sensor plating pattern part 460 and the second lower temperature sensor plating pattern part 470 are plated including the temperature sensor soldering holes 500, respectively, so that the leads 22 of the temperature sensor 20 are soldered to be electrically connected with the second upper temperature sensor plating pattern part 460 and the second lower temperature sensor plating pattern part 470.

At this time, the first upper temperature sensor plating pattern part 440 and the first lower temperature sensor plating pattern part 450, and second upper temperature sensor plating pattern part 460 and the second lower temperature sensor plating pattern part 470 are partitioned by the first and second temperature sensor slit grooves 420 and 430 and the temperature sensor hole 410 described above. The upper and lower parts of the inner surfaces of the first and second temperature sensor slit grooves 420 and 430 are plated with gold, respectively, to electrically connect the first upper temperature sensor plating pattern part 440 and the second upper temperature sensor plating pattern part 460, and the first lower temperature sensor plating pattern part 450 and the second lower temperature sensor plating pattern part 470, while the upper and lower parts of the inner surface of the temperature sensor hole 410, that is, the upper temperature sensor plating part 480 and the lower temperature sensor plating part 490 are plated with gold to electrically connect the first upper temperature sensor plating pattern part 440 and the second upper temperature sensor plating pattern part 460, and the first lower temperature sensor plating pattern part 450 and the second lower temperature sensor plating pattern part 470, thereby widening the surface area of the temperature sensor plating pattern part to minimize electrical resistance and maximize thermal conductivity.

In addition, the inner surfaces of the heating element hole 210, the temperature sensor hole 410, the first and second heating element slit grooves 220 and 230, and the first and second temperature sensor slit grooves 420 and 430, and corner portions where the first and second heating element plating pattern parts 240, 250, 260 and 270 and the first and second temperature sensor plating pattern parts 440, 450, 460 and 470 are connected are curved to enable stable plating and prevent damage to the plating parts even after plating.

To sum up, as in the case of the heating element part 200, in the temperature sensor part 400 of the present disclosure, the first upper temperature sensor plating pattern part 440 and the second upper temperature sensor plating pattern part 460 are connected by the upper temperature sensor plating part 480, and connected with the upper lead 22 of the pair of the leads 22 of the temperature sensor 20, whereas the first lower temperature sensor plating pattern part 450 and the second lower temperature sensor plating pattern part 470 are connected by the lower temperature sensor plating part 490, and connected with the lower lead 22 of the pair of the leads 22 of the temperature sensor 20. Therefore, the surface area of the temperature sensor 20 may be widened to minimize resistance and maximize thermal conductivity, which leads to improved sensitivity of the temperature sensor 20, and accordingly, reaction speed may be improved compared to that of the conventional thermal mass anemometer, making it possible to respond to minute changes and quickly measure and display any changed value.

In addition, since the upper heating element plating part 280, the lower heating element plating part 290, the upper temperature sensor plating part 480, and the lower temperature sensor plating part 490 have a cross-sectional shape in which the substrate 100 is cut to form the heating element hole 210 and the temperature sensor hole 410, the surfaces are rough and unsuitable for gold plating. Thus, the cross-sections of the upper heating element plating part 280, the lower heating element plating part 290, the upper temperature sensor plating part 480, and the lower temperature sensor plating part 490 are first plated with the same material as the substrate surface or with a material that may be easily plated with gold, and then are secondly plated with gold. Accordingly, through the primary plating, the surfaces and corner parts of the upper heating element plating part 280, the lower heating element plating part 290, the upper temperature sensor plating part 480, and the lower temperature sensor plating part 490 are made smooth and eased, enabling stable plating during the secondary plating and preventing peeling or damage of the plating parts even after the secondary plating.

Moreover, conventionally, since the heating element soldering holes 300 are formed on one side (inner side) of the heating element part 200 and the temperature sensor soldering holes 500 are formed on the other side (outer side) of the temperature sensor part 400, the heating element soldering holes 300 and the temperature sensor soldering holes 500 are arranged so that they face outward from each other (the heating element soldering holes 300 and the temperature sensor soldering holes 500 are spaced apart from each other). However, in the present disclosure, since the heating element soldering holes 300 are formed on one side (outer side) of the heating element part 200 and the temperature sensor soldering holes 500 are formed on the other side (inner side) of the temperature sensor part 400, the heating element soldering holes 300 and the temperature sensor soldering holes 500 are arranged so as to face each other inward, so that they are configured in a short distance on the circuit, shortening the circuit interval between the heating element 10 and the temperature sensor 20, thereby reducing resistance and enabling speedy soldering work.

Furthermore, conventionally, since one side leads 12 and 22 of the heating element 10 and temperature sensor 20 are placed on the front surface of the substrate 100 and the other side leads 12 and 22 are placed on the rear surface of the substrate 100, it was difficult and inconvenient to perform soldering by fixing the leads 12 and 22 of the heating element 10 and the temperature sensor 20. On the contrary, in the present disclosure, since both leads 12 and 22 of the heating element 10 and temperature sensor 20 are disposed on the front surface of the substrate 100 and soldered, so that the leads 12 and 22 may be stably fixed and work may be done quickly.

Moreover, conventionally, since one side leads 12 and 22 of the heating element 10 and temperature sensor 20 are placed on the front surface of the substrate 100 and the other side leads 12 and 22 are placed on the rear surface of the substrate 100, wide front and rear surfaces of the heating element 10 and the temperature sensor 20 are arranged vertically in the heating element hole 210 and the temperature sensor hole 410, respectively. In order to arrange those surfaces horizontally, the elements, that is, the heating element 10 and the temperature sensor 20 need to be twisted 90 degrees, and when the elements are twisted 90 degrees, the elements are damaged or the soldering part is affected. However, in the present disclosure, since both leads 12 and 22 of the heating element 10 and temperature sensor 20 are disposed on the front surface of the substrate 100, wide surfaces of the heating element 10 and the temperature sensor 20 are arranged horizontally in the heating element hole 210 and the temperature sensor hole 410, making it possible to operate sensitively even with minute changes in air velocity, and prevent negative effects caused by twisting the elements.

The plating formed on the first upper heating element plating pattern part 240, the first lower heating element plating pattern part 250, the second upper heating element plating pattern part 260, the second lower heating element plating pattern part 270, the upper heating element plating part 280, the lower heating element plating part 290, the first upper temperature sensor plating pattern part 440, the first lower temperature sensor plating pattern part 450, the second upper temperature sensor plating pattern part 460, the second lower temperature sensor plating pattern part 470, the upper temperature Sensor plating part 480, the lower temperature sensor plating part 490 may be plated by selecting one or more of gold, silver, copper, and other alloys with excellent thermal conductivity.

In addition, the soldering pad parts where the heating element leads and the substrate are electrically connected and the soldering pad part where the temperature sensor leads and the substrate are electrically connected are connected to the first upper heating element plating pattern part 240, the first lower heating element plating pattern part 250, the second upper heating element plating pattern part 260, the second lower heating element plating pattern part 270, the upper heating element plating part 280, the lower heating element plating part 290, the first upper temperature sensor plating pattern part 440, the first lower temperature sensor plating pattern part 450, the second upper temperature sensor plating pattern part 460, the second lower temperature sensor plating pattern part 470, the upper temperature Sensor plating part 480, the lower temperature sensor plating part 490 in order to expand the surface area and improve thermal conductivity, as well as increase heat dissipation by eliminating heat generated from the heating element 10 and the temperature sensor 20 and related peripheral elements and the circuit.

Hereinafter, the operating time of the conventional thermal mass anemometer and the operating time of the anemometer using a thermal mass air velocity sensor of the present disclosure are compared and shown.

rate and electrical conductivity so that the surface area temperature of the soldering pad part is almost similar to the ambient temperature, thereby minimizing the change in resistance of the heating element 10 due to minute changes in air velocity; and by minimizing the resistance value of the soldering pad part to induce a quick change in a current, the anemometer may operate in response to minute changes in resistance quickly and accurately.

The above has been described with reference to preferred embodiments of the present disclosure. The present disclosure is not limited to the above embodiments, and based on the above embodiments, those skilled in the art may make various changes without departing from the gist of the present disclosure.

The invention claimed is:

1. An anemometer using a thermal mass air velocity meter, comprising:
   a substrate on which a circuit part is formed;
   a heating element part configured to extend from a first side of the substrate and through which a heating element hole in which a heating element is installed is formed;
   a pair of heating element soldering holes formed on a first side of the heating element part and spaced apart vertically so that a pair of leads of the heating element are connected;

TABLE 1

| TEST REPORT air velocity sensor performance test | test product specifications place & date | clean room/ Jul. 03, 2020 | writer start & end time | Jun-kyu Seong 09:00~18:00 | | | | |
|---|---|---|---|---|---|---|---|---|
| test environment | | response time according to air velocity (m/s) change | | | | | | |
| temperature | sensor type | 0.10 m/s | 0.20 m/s | 0.30 m/s | 0.40 m/s | 0.50 m/s | 0.60 m/s | 0.70 m/s | 0.80 m/s |
| thermo-hygrostat 10.2° C. inside wind 10.3° C. tunnel indoor 10.1° C. | CHC LAB old sensor CHC LAB developed sensor | 40~45 (secs) 10~15 (secs) | 60~70 (secs) 15~20 (secs) | 60~65 (secs) 15~20 (secs) | 60~70 (secs) 15~20 (secs) | 60~70 (secs) 15~20 (secs) | 60~70 (secs) 17~25 (secs) | 60~70 (secs) 20~25 (secs) | 60~70 (secs) 20~25 (secs) |
| thermo-hygrostat 20.2° C. inside wind 20.5° C. tunnel indoor 20.3° C. | CHC LAB old sensor CHC LAB developed sensor | 35~40 (secs) 10~15 (secs) | 55~60 (secs) 15~20 (secs) | 55~60 (secs) 15~20 (secs) | 60~65 (secs) 17~23 (secs) | 60~70 (secs) 20~25 (secs) | 60~70 (secs) 20-25 (secs) | 60~70 (secs) 20~27 (secs) | 60~70 (secs) 25~30 (secs) |
| thermo-hygrostat 30.5° C. inside wind 30.8° C. tunnel indoor 30.1° C. | CHC LAB old sensor CHC LAB developed sensor | 35~40 (secs) 10~15 (secs) | 60~70 (secs) 15~20 (secs) | 60~65 (secs) 15~20 (secs) | 60~70 (secs) 17~23 (secs) | 60~70 (secs) 20~25 (secs) | 60~70 (secs) 30~35 (secs) | 60~70 (secs) 30~35 (secs) | 60~70 (secs) 30~35 (secs) |
| note | | air velocity error range: ±0.03 m/s | | | | | | |

The test of "time to reach a point of action", that is, "response time" of air velocity sensors to changes in air velocity was conducted in the laboratory of CHC LAB, and the response time was checked under three conditions when the ambient temperature was 10° C., 20° C., and 30° C. As shown in the table above, it can be confirmed that the anemometer using a thermal mass air velocity meter of the present disclosure operates more sensitively with a shorter response time than the conventional thermal mass anemometer.

In conclusion, according to the anemometer using a thermal mass air velocity meter of the present disclosure: surface areas of the heating element 10, the temperature sensor 20, and the soldering pad parts are expanded by gold plating, that is, by means of respective plating pattern parts so that the total surface area may be maximized (more than 100 times) to minimize resistance; thermal diffusion is greatly improved by plating gold with excellent heat transfer a temperature sensor part configured to extend from the first side of the heating element part and through which a temperature sensor hole in which a temperature sensor is installed is formed; wherein the temperature sensor part comprises a first side and a second side; and
a pair of temperature sensor soldering holes formed on the second side of the temperature sensor part and spaced apart vertically so that a pair of leads of the temperature sensor are connected,
wherein the temperature sensor part comprises:
   a first temperature sensor slit groove formed on the second side of the temperature sensor part, formed between the pair of temperature sensor soldering holes, and communicated with the temperature sensor hole.

2. The anemometer using a thermal mass air velocity meter of claim 1, wherein the heating element part comprises:

a first heating element slit groove formed on the first side of the heating element part, formed between the pair of heating element soldering holes, and communicated with the heating element hole.

3. The anemometer using a thermal mass air velocity meter of claim 1, wherein the heating element part comprises:
a second heating element slit groove formed on a second side of the heating element part and communicated with the heating element hole.

4. The anemometer using a thermal mass air velocity meter of claim 1, wherein the temperature sensor part comprises:
a second temperature sensor slit groove formed on the first side of the temperature sensor part and communicated with the temperature sensor hole.

5. The anemometer using a thermal mass air velocity meter of claim 1, wherein the heating element part comprises:
a first upper heating element plating pattern part provided by plating gold on an upper part of a front surface of the heating element part and configured to include an upper heating element soldering hole of the pair of heating element soldering holes therein; and
a first lower heating element plating pattern part provided by plating gold on a lower part of the front surface of the heating element part and configured to include a lower heating element soldering hole of the pair of heating element soldering holes therein.

6. The anemometer using a thermal mass air velocity meter of claim 5, wherein the heating element part comprises:
a second upper heating element plating pattern part provided by plating gold on an upper part of a rear surface of the heating element part and configured to include the upper heating element soldering hole of the pair of heating element soldering holes therein; and
a second lower heating element plating pattern part provided by plating gold on a lower part of the rear surface of the heating element part and configured to include the lower heating element soldering hole of the pair of heating element soldering holes therein.

7. The anemometer using a thermal mass air velocity meter of claim 6, wherein the heating element part comprises:
an upper heating element plating part provided by plating gold on an upper surface of the heating element hole, and configured to connect the first upper heating element plating pattern part and the second upper heating element plating pattern part.

8. The anemometer using a thermal mass air velocity meter of claim 7, wherein the heating element part comprises:
a lower heating element plating part provided by plating gold on a lower surface of the heating element hole, and configured to connect the first lower heating element plating pattern part and the second lower heating element plating pattern part.

9. The anemometer using a thermal mass air velocity meter of claim 1, wherein the temperature sensor part comprises:
a first upper temperature sensor plating pattern part provided by plating gold on an upper part of a front surface of the temperature sensor part and configured to include an upper temperature sensor soldering hole of the pair of temperature sensor soldering holes therein; and
a first lower temperature sensor plating pattern part provided by plating gold on a lower part of the front surface of the temperature sensor part and configured to include a lower temperature sensor soldering hole of the pair of temperature sensor soldering holes therein.

10. The anemometer using a thermal mass air velocity meter of claim 9, wherein the temperature sensor part comprises:
a second upper temperature sensor plating pattern part provided by plating gold on an upper part of a rear surface of the temperature sensor part and configured to include the upper temperature sensor soldering hole of the pair of temperature sensor soldering holes therein; and
a second lower temperature sensor plating pattern part provided by plating gold on a lower part of the rear surface of the temperature sensor part and configured to include the lower temperature sensor soldering hole of the pair of temperature sensor soldering holes therein.

11. The anemometer using a thermal mass air velocity meter of claim 2, wherein the heating element part comprises:
a second heating element slit groove formed on a second side of the heating element part and communicated with the heating element hole.

* * * * *